US007575029B2

(12) United States Patent
Robinson

(10) Patent No.: US 7,575,029 B2
(45) Date of Patent: Aug. 18, 2009

(54) TOOL ASSEMBLY FOR EVACUATING, VACUUM TESTING AND CHARGING A FLUID SYSTEM THROUGH A BLEEDER VALVE

(75) Inventor: Randy S. Robinson, Bradford, OH (US)

(73) Assignee: Production Control Units, Inc., Dayton, OH (US)

( * ) Notice: Subject to any disclaimer, the term of this patent is extended or adjusted under 35 U.S.C. 154(b) by 73 days.

(21) Appl. No.: 11/807,394

(22) Filed: May 29, 2007

(65) Prior Publication Data

US 2008/0295917 A1 Dec. 4, 2008

(51) Int. Cl.
*B60T 11/30* (2006.01)
*F16L 37/28* (2006.01)

(52) U.S. Cl. ......................... 141/351; 141/65; 141/383; 184/1.5; 188/352; 137/614.06

(58) Field of Classification Search .................. 141/65, 141/346, 351, 368, 383–386, 392; 184/1.5; 188/352; 137/614.5, 614.6, 798
See application file for complete search history.

(56) References Cited

U.S. PATENT DOCUMENTS

| | | | | | |
|---|---|---|---|---|---|
| 3,301,272 | A | * | 1/1967 | PettyJohn et al. | 137/614.06 |
| 3,677,513 | A | * | 7/1972 | Truelove | 141/98 |
| 3,680,591 | A | * | 8/1972 | Vik | 137/614.05 |
| 3,710,823 | A | * | 1/1973 | Vik | 137/594 |
| 4,149,560 | A | | 4/1979 | Berg | |
| 4,520,992 | A | * | 6/1985 | Sheffer | 251/48 |
| 4,676,269 | A | * | 6/1987 | Sarson | 137/614.06 |
| 4,804,023 | A | * | 2/1989 | Frearson | 141/65 |
| 4,889,149 | A | * | 12/1989 | Weaver et al. | 137/1 |
| 5,074,332 | A | * | 12/1991 | Jones | 137/614.06 |
| 5,088,529 | A | | 2/1992 | Jones et al. | |
| RE34,426 | E | * | 11/1993 | Weaver et al. | 141/66 |
| 5,301,575 | A | * | 4/1994 | Mehlau et al. | 188/352 |
| 5,417,247 | A | * | 5/1995 | Tarui et al. | 138/89.2 |
| 5,429,155 | A | * | 7/1995 | Brzyski et al. | 137/614.04 |
| 5,560,407 | A | | 10/1996 | Swinford | |
| 6,257,285 | B1 | | 7/2001 | Robinson et al. | |
| 6,298,886 | B1 | | 10/2001 | Robinson et al. | |
| 6,334,459 | B1 | * | 1/2002 | Berger | 137/198 |
| 6,581,905 | B2 | * | 6/2003 | Rafko et al. | 141/98 |
| 6,799,614 | B1 | | 10/2004 | Smith et al. | |
| 6,962,321 | B1 | * | 11/2005 | Savage et al. | 141/346 |
| 7,004,214 | B1 | * | 2/2006 | Awad | 141/351 |
| 7,111,402 | B1 | * | 9/2006 | Pearman | 30/158 |

* cited by examiner

*Primary Examiner*—Gregory L Huson
*Assistant Examiner*—Nicolas A Arnett
(74) *Attorney, Agent, or Firm*—Jacox, Meckstroth & Jenkins

(57) ABSTRACT

A tool assembly includes a body supporting a rotatable nut which receives and mates with a bleeder valve threaded into a hydraulic fluid system such as a caliper wheel brake or a clutch for a motorcycle. The nut is sealed to the system, and the nut is rotated to move the bleeder valve to an open position while maintaining the seal between the nut and the fluid system. A passage within the body and the nut provides for evacuating the system and then charging fluid into the system. The nut is rotated to move the bleeder valve to its closed position, and the nut is then unclamped and unsealed from the fluid system. In one embodiment, the bleeder valve is gripped to clamp and seal the nut to the fluid system, and in another embodiment, the nut is sealed to the system using a clamping member opposing the nut.

8 Claims, 3 Drawing Sheets

TOOL ASSEMBLY FOR EVACUATING, VACUUM TESTING AND CHARGING A FLUID SYSTEM THROUGH A BLEEDER VALVE

BACKGROUND OF THE INVENTION

The present invention relates to tool assemblies for evacuating and charging fluid systems such as, for example, the tool assemblies disclosed in U.S. Pat. No. 5,560,407, No. 6,257,285, No 6,298,886 and No. 6,799,614 which issued to the assignee of the present invention. These tool assemblies are used for evacuating, vacuum testing and filling or charging a fluid system such as a motor vehicle coolant system or an air conditioning system or a fuel tank system. It is also known to evacuate and fill a motor vehicle hydraulic brake system through the master brake cylinder, for example, as disclosed in U.S. Pat. No. 5,088,529. Air and hydraulic fluid has also been removed from a motor vehicle hydraulic wheel brake cylinder through a bleeder valve projecting from the cylinder and then recharge brake fluid into the brake cylinder through the bleeder valve, for example, as disclosed in U.S. Pat. No. 3,677,513, No. 4,149,560, No. 6,581,905 and No. 7,004,214. Sometimes, the tool has a laterally projecting handle for rotating the tool to unthread and open the bleeder valve, as disclosed in U.S. Pat. No. 3,677,513 and No. 7,004,214, or may receive a socket wrench as also disclosed in the '214 patent.

Commonly, the tools which couple with a bleeder valve snap onto or lock onto the nipple or top portion of the bleeder valve. The handle on the tool or a separate wrench is used to open the bleeder valve, and a suction is used to remove any air and/or brake fluid in the brake system. However, the tool assemblies are not suited to vacuum test the brake system for leaks at the end of the evacuation step or pressure fill the brake cylinder with brake fluid since air or hydraulic fluid will leak around the threads connecting the bleeder valve to the brake system. Furthermore, on some motor vehicles, such as a motorcycle or other recreational vehicles, very limited space is provided for accessing a bleeder valve on a wheel brake cylinder and usually there is no space for rotating the coupler tool to rotate the bleeder valve between its open position and closed position.

SUMMARY OF THE INVENTION

The present invention is directed to an improved tool assembly for evacuating and charging or pressure filling a hydraulic fluid system having a bleeder valve and which is also adapted for vacuum testing the fluid system for leaks after evacuation of the system. The tool assembly of the invention is also compact so that it may be used with a bleeder valve having limited space around the valve and which also permits the use of a torque wrench when tightening the bleeder valve. In addition, the tool assembly of the invention provides for a positive lock or clamp to the bleeder valve and a positive fluid-tight seal with the fluid system so that the steps of evacuating, vacuum testing and pressure filling of the hydraulic fluid system may be quickly and efficiently performed in succession.

In accordance with the illustrated embodiments of the invention, a tool assembly includes a tool body supporting a rotatable tubular nut engageable with the bleeder valve for rotating the bleeder valve between a closed position and an open position for the fluid system. A resilient sealing ring or member is disposed between the nut and the fluid system, and a hand actuated lever clamping mechanism clamps the nut to the fluid system with the resilient member forming a fluid-tight seal between the nut and the fluid system. A passage extends through the nut to the bleeder valve and is adapted to be connected through flexible hoses to an evacuating source, vacuum pressure testing equipment and a pressurized hydraulic fluid supply source after which the nut is used to close the bleeder valve while a fluid-tight seal is maintained between the nut and the fluid system both during opening and closing the bleeder valve.

Other features and advantages of the invention will be apparent from the following description, the accompanying drawings and the appended claims.

DESCRIPTION OF THE ILLUSTRATED EMBODIMENTS

Figure 1:
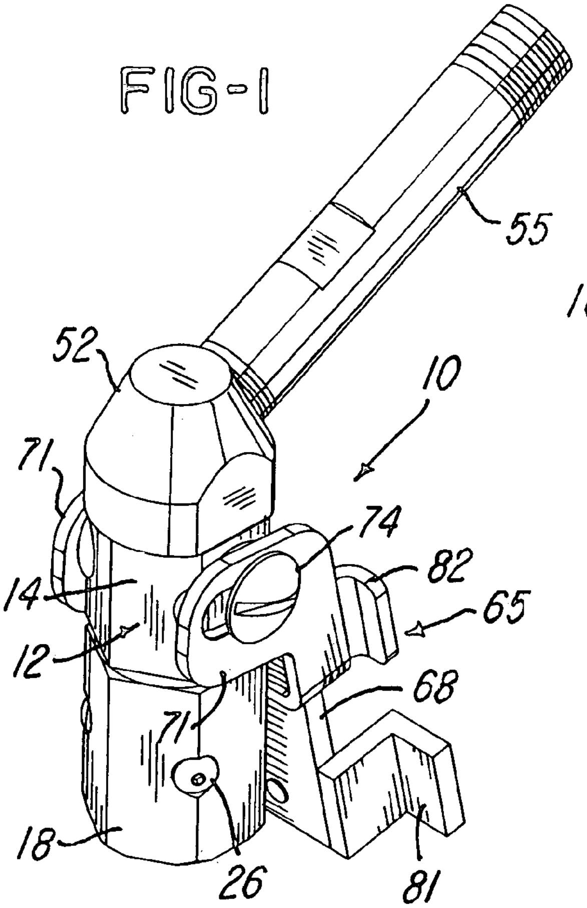
FIG. 1 is a perspective view of a tool assembly constructed in accordance with the invention and in its unclamped position.

FIG. 1 illustrates a tool assembly 10 which includes a body 12 having a hexagonal upper portion 14 and a cylindrical tubular portion 16 (FIG. 2) which supports a rotary nut member 18 having a hexagonal outer surface and an inwardly projecting annular flange portion 21 having a hexagonal opening 22. An external groove 24 is formed in the outer surface of the tubular portion 16 of the body 12 and receives a set of three screws 26 threaded into the nut member 18 and having recessed head portions. The screws 26 permit rotation of the nut member 18 on the tubular portion 16 without relative axial movement. An internal tubular member 30 is supported for axial movement within the tubular portion 16 of the body 12 and has an annular lower end portion defining a cylindrical bore or cavity 33. The lower end portion of the tubular member 30 also has six circumferentially spaced holes 34 which receive corresponding spherical balls 36 which project outwardly into a cylindrical bore 38 extending downwardly from a frusto-conical cam surface 41.

A resilient O-ring 43 is confined within an annular groove at the top of the cavity 33, and a resilient O-ring 44 forms a fluid-tight seal between the tubular portion 16 of the body 12 and the tubular member 30 within the tubular portion. Another resilient O-ring 47 is confined within a groove formed within the nut member 18 and forms a fluid-tight seal between the nut member 18 and the tubular portion 16 of the body 12. The tubular member 30 defines an axially extending fluid passage 50 and has an upper head portion 52 which receives an inner end portion of an evacuation and fluid supply tube 55 having a center passage 56 which connects with the passage 50. A set of two diametrically opposed and parallel anti-rotation pins 58 have upper end portions secured to the head portion 52 of the tubular member 30. The pins 58 project downwardly into corresponding axially extending bores or holes 61 within the upper hexagonal portion 14 of the body 12. The pins 58 permit the tube member 30 to move axially within the body 12 but prevent relative rotation.

Figure 2:
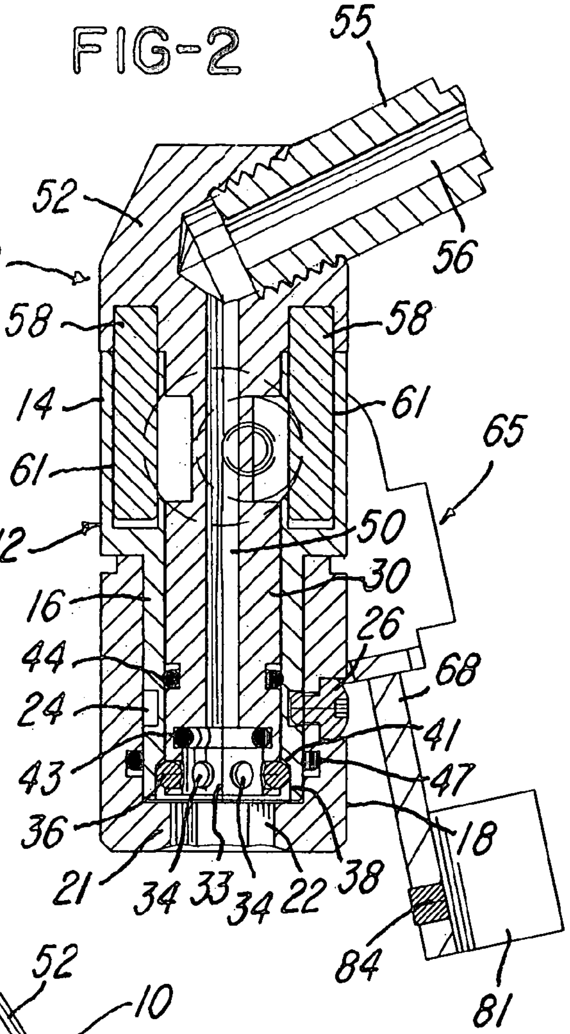
FIG. 2 is an axial section of the tool assembly shown in FIG. 1.
Figure 3:
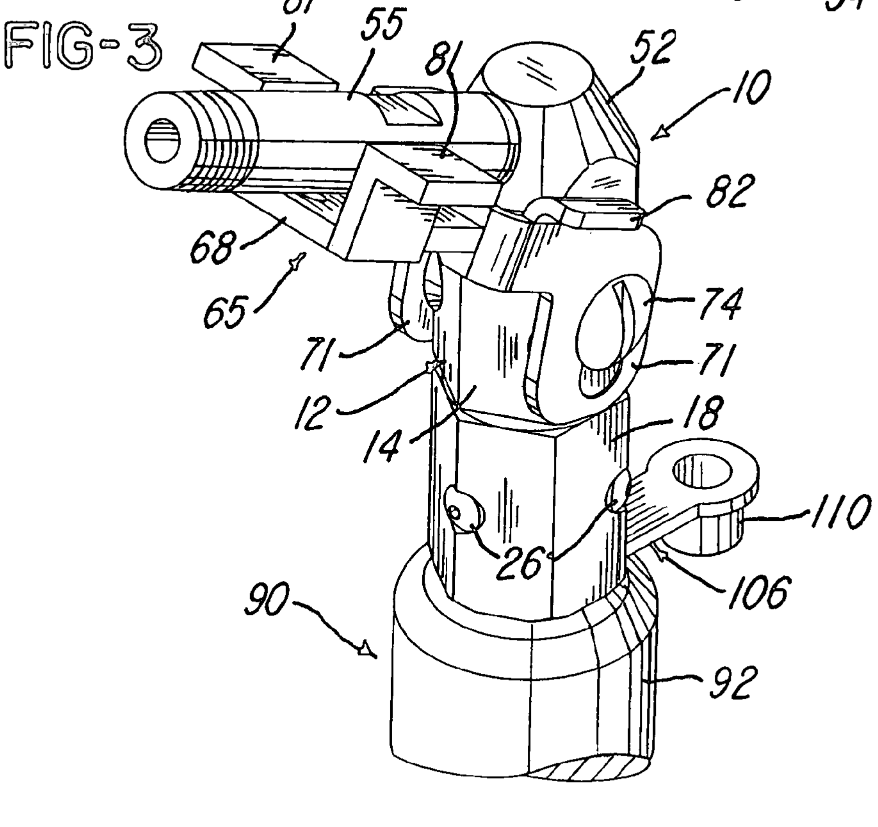
FIG. 3 is a perspective view of the tool assembly shown in FIG. 1 and in a clamped and sealed position on a hydraulic fluid system.
Figure 4:
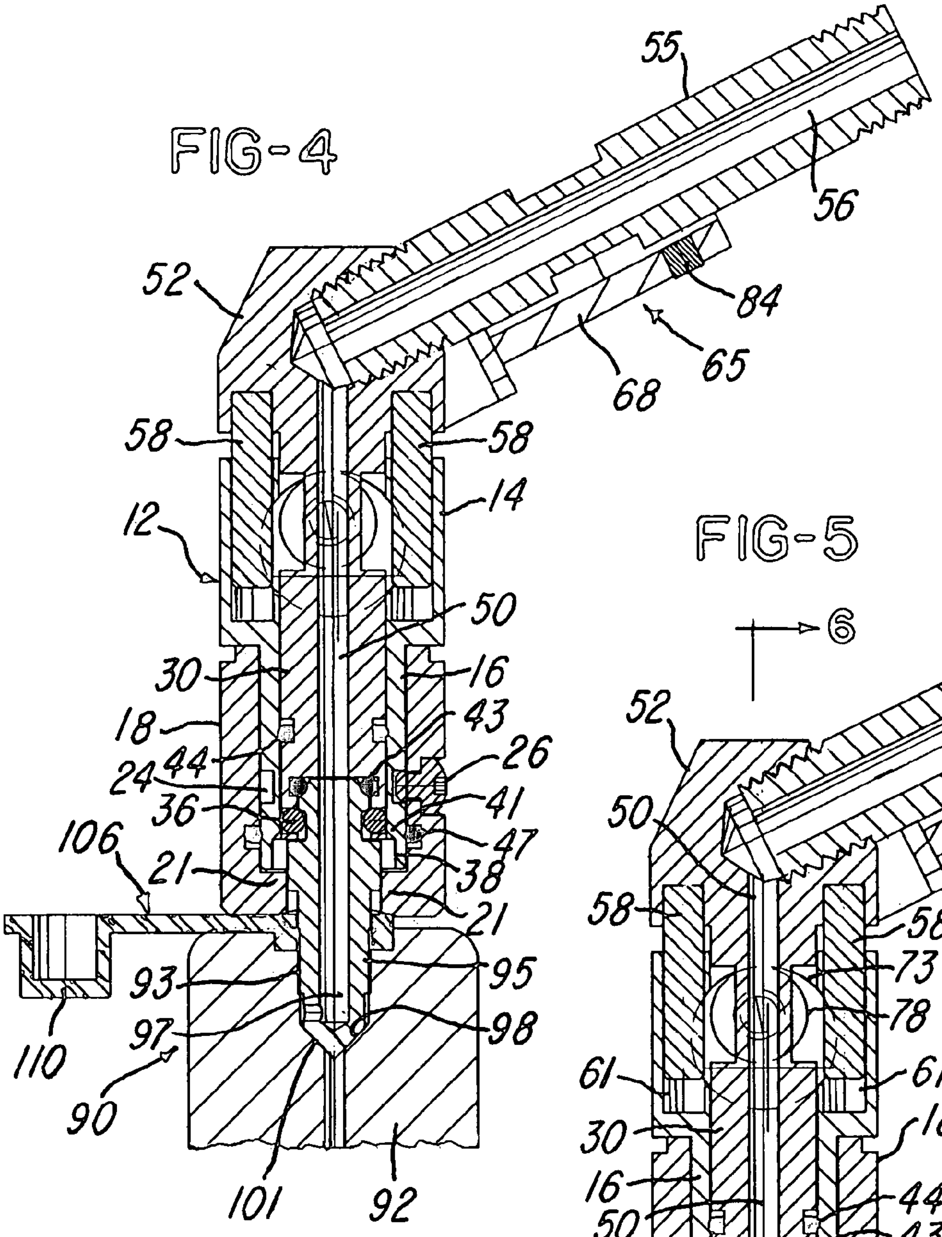
FIG. 4 is an axial section of the tool assembly clamped and sealed to a hydraulic fluid system having a bleeder valve in its closed position.
Figure 6:
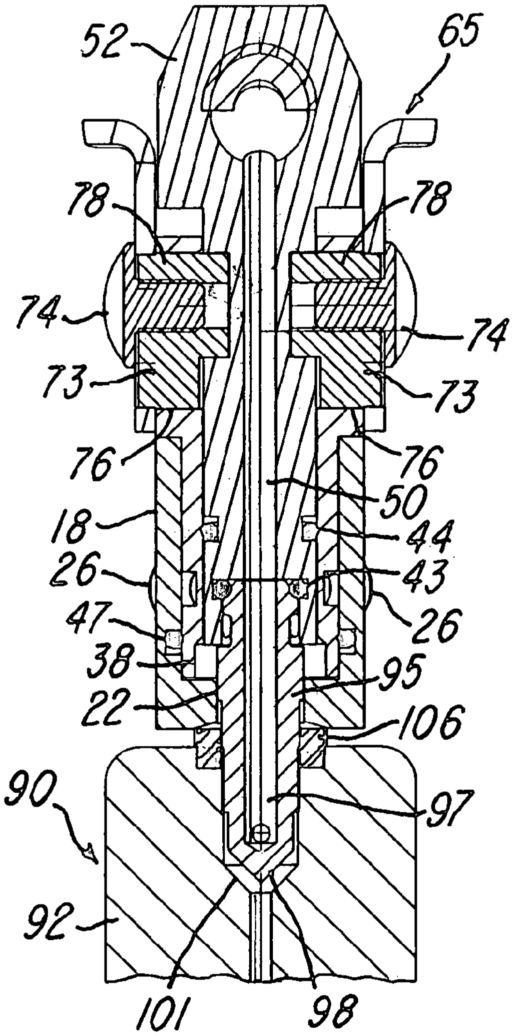
FIG. 6 is an axial section of the tool assembly, taken generally on the line of 6-6 of FIG. 5.

A hand actuated latch mechanism 65 is effective to move the tubular member 30 axially within the body 12 in response to pivoting a hand actuated lever 68 between a released position (FIG. 2) and a locked position (FIGS. 3 & 4). As shown in FIGS. 1-3, the lever 68 has parallel spaced side flanges 71 which are secured to rotatable eccentric cam members 73 (FIG. 6) and are retained by a pair of screws 74. The larger eccentric portions of the cam members 73 rotate in cylindrical bores 76 within the upper body portion 14, and the smaller cylindrical portions 78 of the cam members 73 rotate within corresponding bores within the tubular member 30. The lever 68 has outwardly projecting tabs 81 and 82 to facilitate gripping the lever and moving the lever between its released position (FIGS. 1 & 2) and an overcenter locked position (FIGS. 3 & 4) where the lever is retained by a permanent magnet 84 attracted to the metal tube 55. A similar latch mechanism is disclosed in U.S. Pat. No. 5,074,332 which issued to the assignee of the present invention and the disclosure of which is herein incorporated by reference.

In the released position of the latch mechanism 65, the tool assembly 10 is adapted to be mounted on a hydraulic brake system 90 including a caliper brake cylinder or housing 92 having a threaded bore 93 (FIG. 4) which receives a conventional bleeder valve member 95. The bleeder valve has a center fluid passage 97 and a cone-shaped inner end surface 98 which normally engages a tapered annular valve seat 101 when the bleeder valve 95 is in its closed position, as shown in FIG. 4. The upper head portion of the bleeder valve 95 has a tapered end surface which engages the upper end of the counterbore 33 within the tubular member 30. The resilient O-ring 43 forms a fluid-tight seal between the tubular member 30 and the upper end surface of the bleeder valve 95. The upper head portion of the bleeder valve 95 also has a peripheral groove 103 which is adapted to receive the balls 36 which are cammed inwardly into the groove when the tool assembly 10 is clamped to the bleeder valve 95 in response to moving the latch mechanism 65 between its released position (FIG. 2) and its locked position (FIG. 4).

Figure 5:
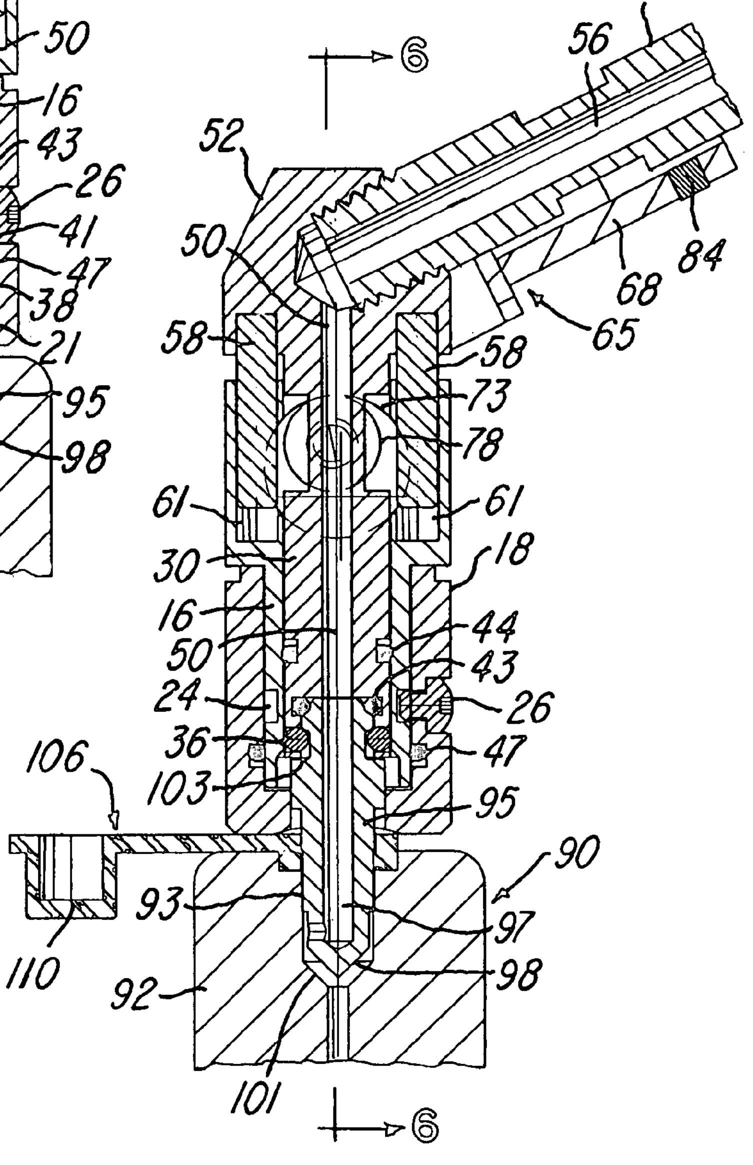
FIG. 5 is an axial section of the tool assembly similar to FIG. 3 and showing the bleeder valve in its open position.

When the tool assembly 10 is coupled to and locked on the bleeder valve 95, (FIG. 5), the lower end portion 21 of the nut member 18 compresses a resilient annular sealing member 106 located between the nut 18 and the caliper brake housing 92. As shown in FIGS. 3-5, the annular resilient sealing member 106 is formed by a flexible and resilient cap member 110 which is commonly carried by a bleeder valve and normally flexes to cover the upper end portion or nipple of the bleeder valve when it is in its closed position, as shown in FIG. 4. After the tool assembly 10 is positively coupled to the bleeder valve 95 and positively sealed to the caliper brake housing 90 in response to actuation of the latch mechanism 65, an open end wrench (not shown) is used on the nut 18 to rotate the nut and the bleeder valve 95 from its closed position (FIG. 4) to its open position (FIG. 5) since the hexagonal opening 22 in the nut mates with the hexagonal outer surface on the bleeder valve 95.

Only a slight rotation of the nut 18, for example, between 90 degrees and 180 degrees, is required to move the bleeder valve 95 axially between its closed position and its open position. In the open position, the nut 18 maintains its positive fluid-tight seal with the caliper brake housing 92 so that the passages 50 and 97 are connected in fluid-tight relation by the O-ring seals 43, 44 and 47 and the cap member 110. After the bleeder valve 95 is in its open position from the valve seat 101, the brake system is evacuated through the bleeder valve 95, and then the brake system is vacuum checked or tested at a low vacuum level such as a 2 Torr vacuum. This vacuum check tests the brake system for any possible leaks. The brake system is then pressure filled with hydraulic brake fluid after which the brake fluid is checked for pressure stabilization. Brake fluid is then scavenged from the hose connected to the tube 55, and the bleeder valve 95 is rotated to its closed position by rotating the nut 18, preferably with the use of a torque wrench. The lever 68 of the latch mechanism 65 is then pivoted to its released position, and the tool assembly 10 is removed from the bleeder valve 95.

Figure 7:
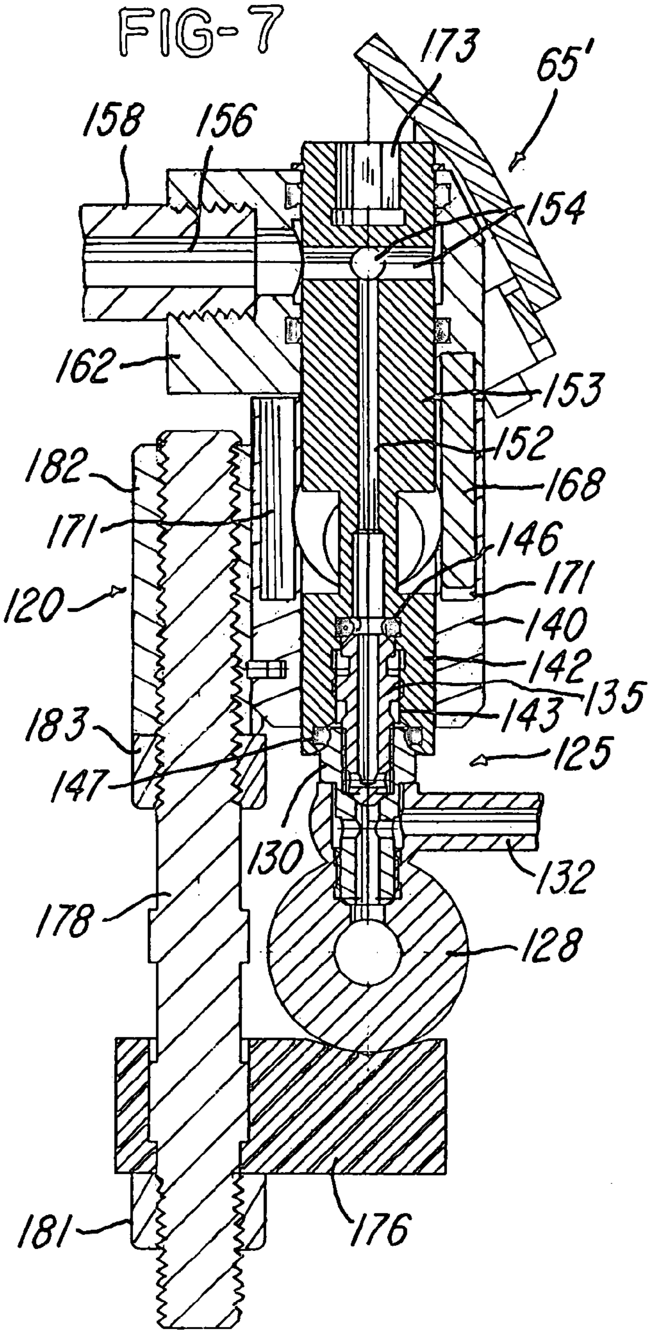
FIG. 7 is an axial section through a modified tool assembly constructed in accordance with another embodiment of the invention.

FIG. 7 illustrates a modification or another embodiment of a tool assembly 120 constructed in accordance with the invention and which is ideally suited for evacuating, vacuum checking and pressure filling a hydraulic fluid clutch system 125 which includes a clutch housing or cylinder 128 having an attached banjo fitting 130 connecting a clutch fluid conduit 132 to the housing 128. The fitting 130 receives a bleeder valve member or bleeder valve 135 which normally engages a tapered valve seat within the fitting 130 when the bleeder valve 135 is in its closed position. The tool assembly 120 includes a body 140 which supports an elongated nut member 142 having a hexagonal counterbore 143 which receives and mates with a hexagonal flange on the bleeder valve 135. Resilient O-rings 146 and 147 are confined within corresponding grooves within the nut member 142 and are positioned to form fluid-tight seals between the nut member 142 and the fitting 130 of the fluid system 125 and between the nut member 142 and the bleeder valve 135. The nut member 142 defines an axially extending center passage 152 which connects with a cross passage 154 within an upper end portion 153 of the nut member, and the passage 154 connects with a passage 156 within a tube 158 threaded into a block 162 receiving the upper cylindrical portion 153 of the nut member 142 and sealed by a pair of O-rings for rotation of the nut member within the block 162.

A set of two anti-rotation pins 168 are secured to the block 162 and are received within corresponding bores 171 within the body 140. As explained above, the pins 168 provide for axial movement of the block 162 and the nut member 142 relative to the body 140 in response to actuation of a latch mechanism 65' constructed and operated in the same manner as the latch mechanism 65 described above in connection with FIGS. 1-6. A non-cylindrical or hexagonal cavity or recess 173 is formed within the upper end portion 153 of the nut member 142 and is adapted to receive a wrench for rotating the nut member 142 after it is clamped onto and sealed to the bleeder valve 135 and the fitting 130 of the fluid system 125.

In place of locking the nut member 142 to the bleeder valve 135, the tool assembly 120 includes a swivel back-up clamping member 176 which engages the opposite side of the clutch cylinder 128 in opposing relation to the bleeder valve 135. The back-up member 176 is connected to the body 140 by an adjustable tie rod 178 having one end portion receiving the back-up member 176 and secured by a threaded nut 181. The opposite or upper end portion of the rod 178 is threaded into a block 182 attached to the body 140 and secured by a lock nut 183. Adjustment of the tie rod 178 and back-up member 176 provide for accommodating clutch housings or cylinders of different sizes or diameters.

The operation of the tool assembly 120 is generally the same as the tool assembly 10 described above. That is, when the latch mechanism 65' is in its released position, the tool assembly is mounted on the clutch system 125 with the nut member 142 receiving and engaging the bleeder valve 135. When the latch mechanism 65' is operated to its overcenter locked position, the nut member 142 is clamped and sealed to the fitting 130 of the clutch system 125 and is also sealed to the bleeder valve 135. The nut member 142 is then rotated within the range of 90 degrees to 180 degrees with a wrench engaging the recess 173 in order to rotate the nut member and bleeder valve 135 from its closed position (FIG. 7) to its open position (not shown) while the nut member 142 remains sealed to the clutch system 125 and to the bleeder valve 135. The clutch system is then evacuated through a flexible hose connected to the tube 158, after which it is vacuum tested for possible leaks. The clutch 125 is then pressure filled or charged with hydraulic fluid supplied to the clutch system through the passages 156, 154, 152 and the passage within the bleeder valve 135.

From the drawings and the above description, it is apparent that a tool assembly constructed in accordance with the invention provides desirable features and advantages. For example, by positively clamping and sealing on the brake system 90 or clutch system 125 when the bleeder valve is in its closed position and also maintaining the seal while the bleeder valve is rotated to its open position, the brake system or clutch system may be evacuated to a low vacuum and vacuum tested for possible leaks, and then pressure filled with hydraulic fluid. As a result, the entire cycle of operation is efficiently performed in a minimum of time which is highly desirable during the production of motor vehicles such as new motorcycles and other recreational vehicles. The tool assembly is also compact and may be used when space is very limited, especially when there is no space to rotate a tool assembly. The tool assembly 10 also utilizes the existing resilient and flexible cap member 110 to form a positive seal between the nut member 18 and the brake system 90 or caliper brake housing 92.

While the forms of tool assembly herein described constitute operable embodiments of the invention, it is to be understood that the invention is not limited to these precise forms of tool assemblies, and that changes may be made therein without departing from the scope and spirit of the invention as defined in the appended claims.

What is claimed is:

1. A tool assembly in combination with a hydraulic fluid system including a housing defining a threaded bore with a valve seat receiving an end surface of a tubular bleeder valve member threaded into said bore and with said bleeder valve member having a head portion and movable axially between a closed position and an open position relative to said seat in response to rotation of said bleeder valve member, said tool assembly comprising a tubular body supporting a rotatable annular tubular nut member having an opening slidably engaging said head portion of said bleeder valve member and effective to rotate said bleeder valve member between said closed position and said open position without axial movement of said nut member, a resilient sealing member between said nut member and said housing of fluid system, a tubular member extending axially within said tubular body and releasably connected and sealed to said head portion of said bleeder valve member, a latch mechanism operable to move said tubular member axially within said tubular body for connecting said tubular member to said bleeder valve member and to clamp said nut member to said housing of said fluid system with said sealing member forming a fluid-tight seal between said nut member and said housing of said fluid system, a passage extending through said tubular member to said bleeder valve member and adapted to be connected to an evacuating source, a vacuum tester and a pressurized fluid supply source, and said bleeder valve member being movable axially between said open position and said closed position in response to rotation of said nut member while said sealing member maintains said fluid-tight seal between said nut member and said housing of said fluid system.

2. The combination defined in claim 1 wherein said resilient sealing member comprises an annular portion surrounding said bleeder valve member and integrally connected to a flexible and resilient cap portion adapted to cover said head portion of said bleeder valve member.

3. The combination defined in claim 1 wherein said tubular body includes a cylindrical portion supporting a cylindrical said tubular member for non-rotary axial movement within said tubular portion of said body, and said nut member is supported for rotary movement on said cylindrical portion of said body.

4. The combination defined in claim 3 and including resilient sealing rings forming fluid-tight seals between said tubular member and said bleeder valve member and between said cylindrical portion of said body and said tubular member and between said nut member and said cylindrical portion of said body to provide for efficiently evacuating, vacuum testing and pressure filling of said fluid system.

5. The combination defined in claim 3 and including a set of parallel spaced anti-rotation pins connecting said body and a portion of said tubular member and providing for said non-rotary axial movement of said tubular member within said cylindrical portion of said body.

6. The combination defined in claim 3 wherein said latch mechanism comprises rotatable eccentric cam members connecting said body to said tubular member and providing for axial movement of said tubular member within said body and for clamping said nut member to said valve housing of said fluid system, and a hand actuated lever connected to rotate said cam members.

7. The combination defined in claim 1 wherein said latch mechanism comprises lever actuated rotatable eccentric cam members connecting said body to said tubular member and providing for clamping said nut member to said housing of said fluid system.

8. The combination defined in claim 1 wherein said tubular body includes a cylindrical portion supporting said nut member for rotation on said tubular portion, an external annular groove within said cylindrical portion of said body, and at least one screw extending radially through said nut member and into said groove to restrict axial movement of said nut member on said cylindrical portion of said body.

* * * * *